Patented Dec. 6, 1932

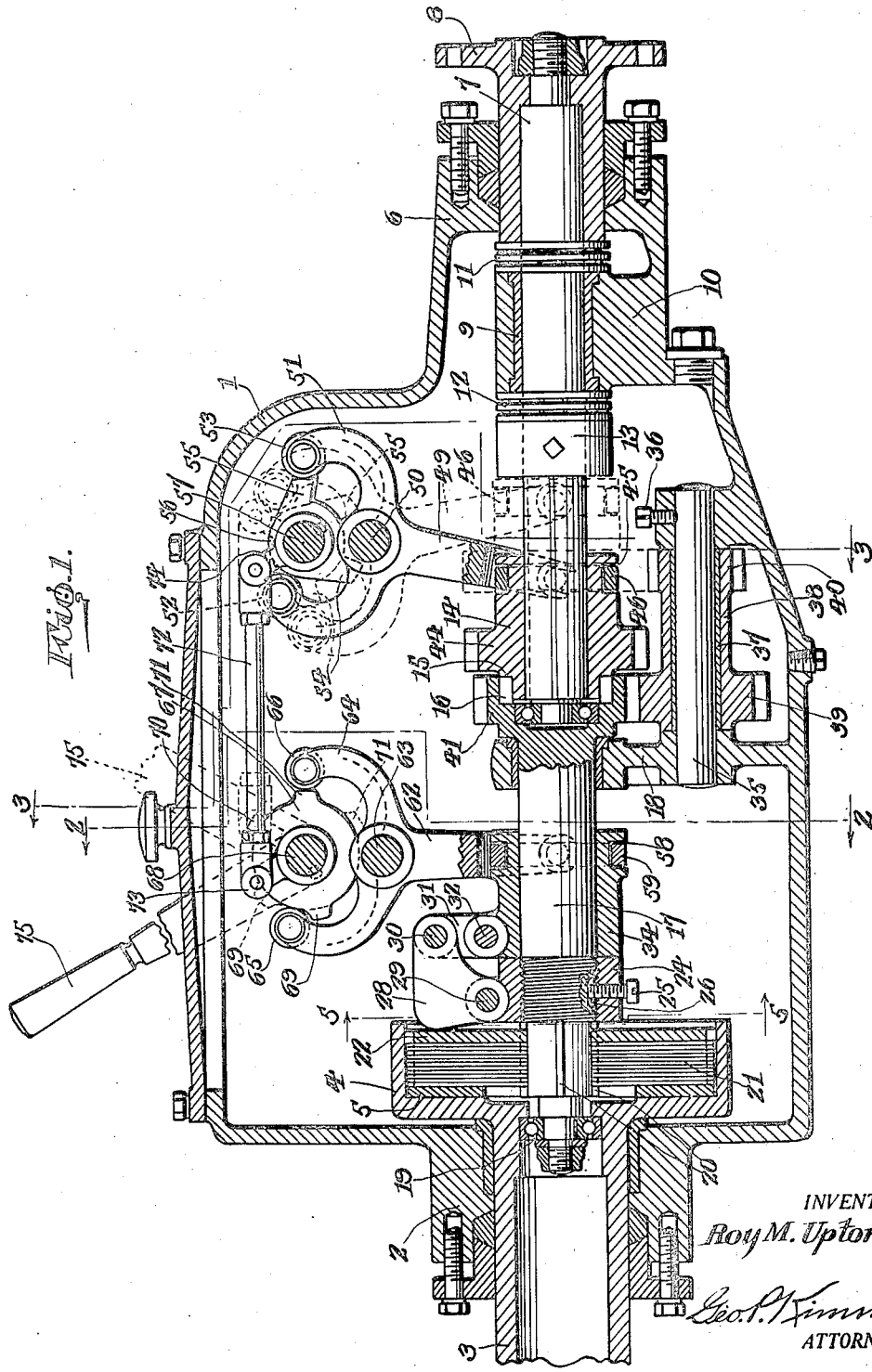

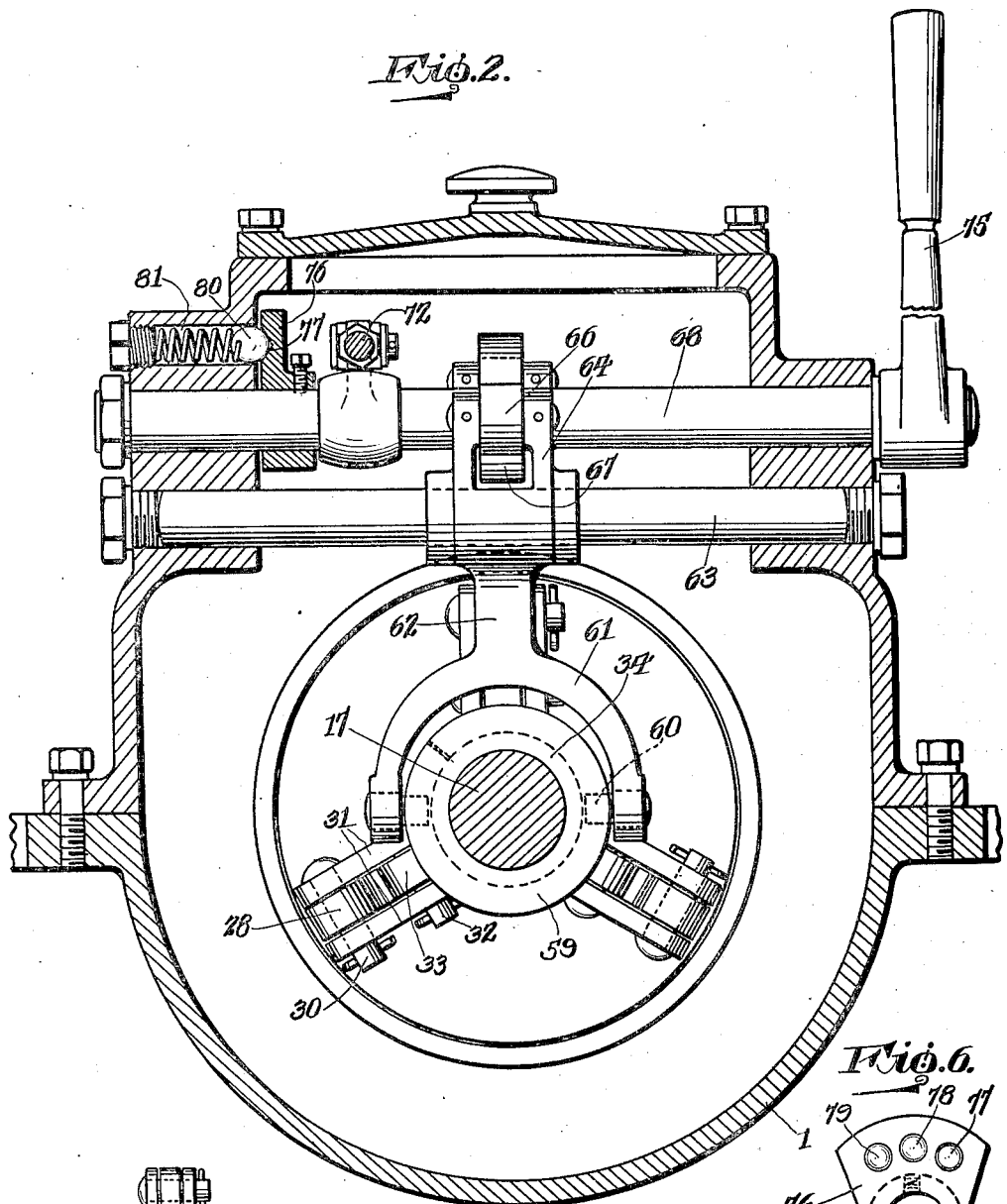
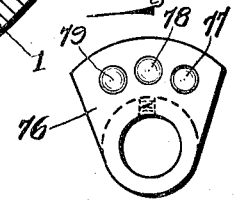
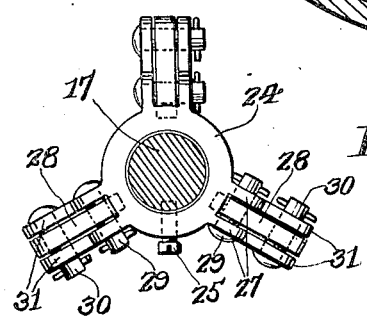

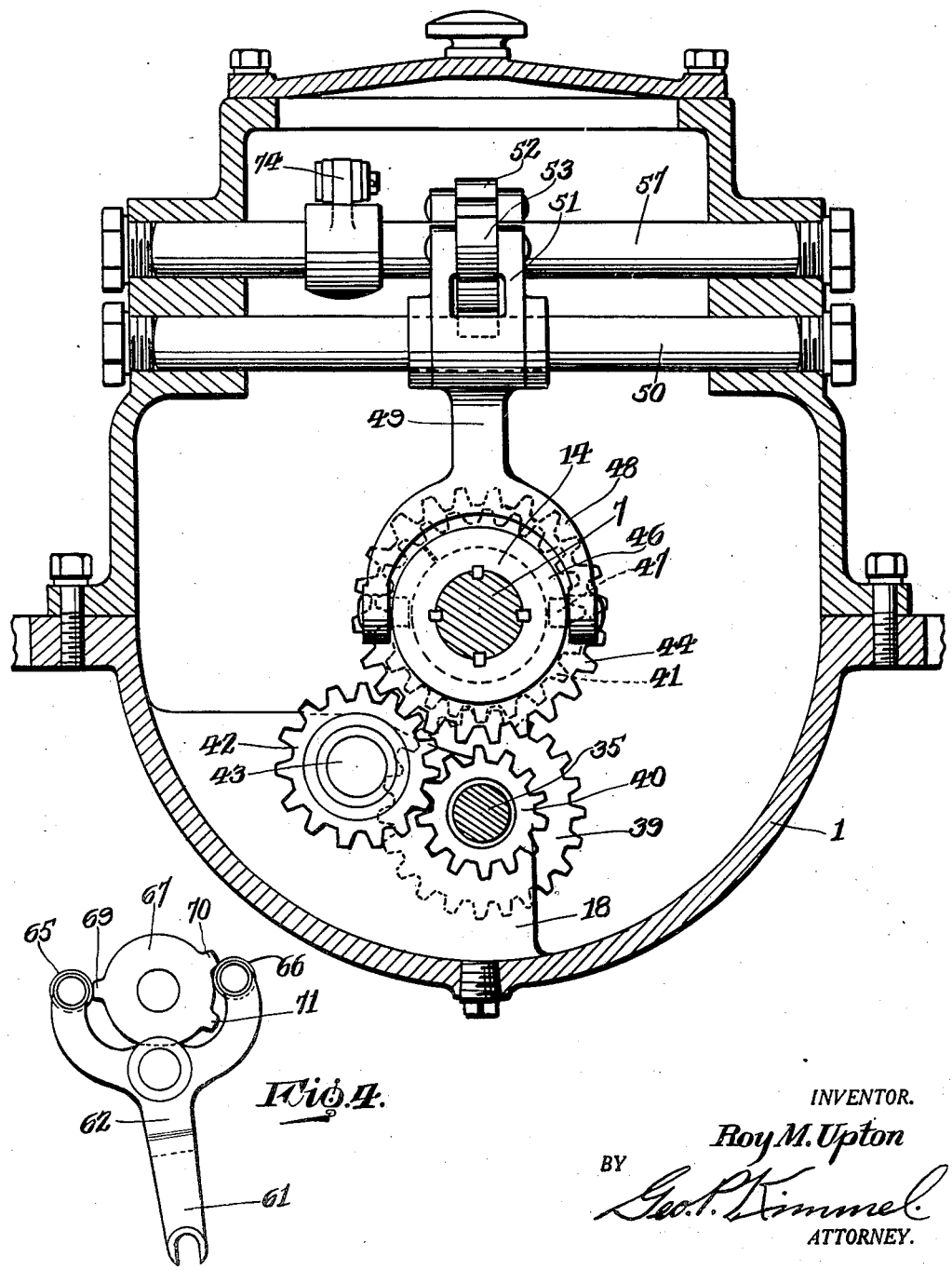

1,889,909

UNITED STATES PATENT OFFICE

ROY M. UPTON, OF MIAMI, FLORIDA

REVERSE GEAR AND CLUTCH OPERATING MECHANISM

Application filed August 23, 1930. Serial No. 477,409.

This invention relates to a reverse gear and clutch operating mechanism particularly adapted for use in connection with motor boats although the same may be employed for any other purpose for which the same is found to be applicable.

The primary object of the invention is to provide, in a manner as hereinafter set forth, a reverse gear and clutch operating mechanism operated from a single lever, whereby a sliding coupling element may be moved into selective positions to provide for corresponding or reverse motion of a driven shaft with respect to an intermediate shaft, and whereby the intermediate shaft may be clutched with respect to a drive shaft after the coupling element has been moved into a selected position.

A further object of the invention is to provide a reverse gear and clutch operating mechanism of the character aforesaid wherein the intermediate shaft is automatically declutched with respect to the drive shaft at all times except when the sliding coupling element is in position to provide for either forward or reverse motion of the driven shaft.

A further object of the invention is to provide a reverse gear and clutch operating mechanism of the character aforesaid wherein all movable elements are positively actuated without the employment of tension elements.

With the foregoing and other objects in view the invention consists of the novel construction, combination and arrangement of parts as hereinafter more particularly described, and as illustrated in the accompanying drawings wherein is shown an embodiment of the invention, but it is to be understood that the description and drawings are to be taken as illustrative and that the invention is intended to be limited only by the scope of the claims hereunto appended.

In the accompanying drawings in which like numerals are employed to designate like parts throughout the several views:—

Figure 1 is a vertical section showing a reverse gear and clutch operating mechanism in accordance with this invention.

Figure 2 is a section taken on the line 2—2 of Figure 1.

Figure 3 is a section taken on the line 3—3 of Figure 1.

Figure 4 is a detailed view in elevation showing the shifting member for the clutch mechanism in position for maintaining such mechanism inoperative.

Figure 5 is a section taken on the line 5—5 of Figure 1.

Figure 6 is a detail view in elevation showing the selector element for the actuating lever.

Referring to the drawings in detail, the numeral 1 indicates a housing provided at its upper end with a stuffing box 2 through which a drive shaft 3 extends, the drive shaft being adapted for connection with a suitable prime mover, not shown. The drive shaft 3 projects into the housing 1 and is provided within the latter with a drum 4 within which is secured an annular plate 5 arranged concentrically of the shaft 3. At the rearward end thereof the housing 1 is provided with a stuffing box 6 through which a driven shaft 7 extends, the driven shaft 7 being provided at its outer end with a flanged coupling sleeve 8 which is journaled in the stuffing box 6. Inwardly of the sleeve 8, the shaft 7 is provided with a sleeve 9 which is journaled in a bearing 10 formed on the housing 1 inwardly of the stuffing box 6. The shaft 7 is provided with a thrust bearing 11 which is interposed between the sleeve 8 and bearing 10. A similar thrust bearing 12 is provided on the shaft 7, the bearing 12 being interposed between the bearing 10 and a collar 13 fixedly secured to the shaft 7.

Slidably mounted on the shaft 7 is a coupling element 14 which is provided with a clutch face 15 for engagement with a coacting clutch face 16 at the rearward end of an intermediate shaft 17. Spaced from the rearward end thereof the shaft 17 is journaled in a support 18 formed within the housing 1, the forward end of the shaft 17 being provided with a bearing assembly 19 rotatably mounted within the hollow inner end of the drive shaft 3. Slidably and non-rotatably mounted on the shaft 17, by means of a plurality of longitudinally extending ribs 20, are a plurality of discs 21 which are adapted to be forced into frictional engagement with the annular plate 5 by means of an annular plate 22 slidably and non-rotatably mounted on the shaft 17. Adjacent the rearward ends of the ribs 20, the shaft 17 is externally threaded as indicated at 23 to receive a collar 24 which is adjustable longitudinally of the shaft. Rotation of the collar 24 relative to the shaft 17 is normally prevented by means of a set screw 25 which is threaded through the wall of the collar 24 and projects into a slot 26 extending lengthwise of the shaft.

Projecting radially from the collar 24 are a plurality of spaced pairs of spaced lugs 27. Between each pair of the lugs 27 is pivotally connected one end of an angular actuating member 28, such member being connected with the lugs 27 by means of a pivot pin 29. Pivotally connected to the opposite ends of each member 28, by means of a pivot pin 30, are a pair of links 31 which are pivotally connected at their opposite ends, by means of a pivot pin 32, with a lug 33 projecting radially from a sleeve 34 slidably mounted on the shaft 17. While the sleeve 34 normally rotates with the shaft 17, the same is rotatably mounted with respect thereto in order to provide for adjustment of the collar 24. In the embodiment shown, three of the actuating members 28 are employed which necessitates the employment of three of the lugs 33 on the sleeve 34, each of the lugs 33 being connected with one of the members 28 by means of a pair of the links 31.

Mounted on the support 18 and extending longitudinally of the housing is a stationary shaft 35 which is maintained against movement by means of a set screw 36. Carried by the shaft 35 is a bushing 37 upon which is mounted a sleeve 38 formed at one end with a gear 39 and at its opposite end with a pinion 40. The gear 39 is in permanent mesh with a gear 41 formed at the rearward end of the shaft 17, while the pinion 40 is in permanent mesh with an idler gear 42 mounted on a stub shaft 43 carried by the housing 1. The coupling element 14 is formed with a gear 44 which is adapted to be brought into mesh with the idler gear 42 by sliding the coupling element 14 rearwardly on the driven shaft 7.

Adjacent the rearward end thereof the coupling element 14 is formed with a circumferentially extending groove 45 within which is rotatably mounted a split collar 46. Formed with the collar 46 at diametrically opposite points of the latter are a pair of lugs 47 which are engaged by a vertically disposed yoke 48 formed at the lower end of a shifting member 49. The shifting member 49 is rotatably mounted on a shaft 50 extending transversely of the housing 1 and is provided at its upper end with a vertically disposed yoke 51 having its arms arranged at a right angle to the arms of the yoke 48. End portions of the arms of the yoke 51 are bifurcated and are provided with rotatably mounted rollers 52 and 53 respectively. The rollers 52 and 53 are adapted to be engaged by lobes 54 and 55 respectively for the purpose of rocking the shifting member 49 on the shaft 50. The lobes 54 and 55 are formed on a cam 56 which is mounted on a shaft 57 extending transversely of the housing 1.

The sleeve 34 is provided adjacent its rearward end with a circumferentially extending groove 58 within which is rotatably mounted a split collar 59 similar to the split collar 46. Formed at diametrically opposite points of the split collar 59 are a pair of lugs 60 which are engaged by a vertically disposed yoke 61 formed on the lower end of a shifting member 62 which is mounted on a shaft 63 extending transversely of the housing 1. The shifting member 62 is formed at its upper end with a vertically disposed yoke 64 having its arms arranged at a right angle to the arms of the yoke 61, the end portions of the arms of the yoke 64 being bifurcated and provided with rollers 65 and 66 respectively. Disposed between the rollers 65 and 66 is a cam 67 which is mounted on a shaft 68 extending transversely of the housing 1. The cam 67 is provided on its periphery with a plurality of lobes 69, 70 and 71 respectively. The shaft 68 is operatively connected with the shaft 57 by means of a connecting rod 72, the ends of which are connected with lugs 73 and 74 projecting radially from the shafts 68 and 57 respectively. The shaft 68 is provided at one end thereof with an operating lever 75. The lobes 70 and 71 are disposed in closer proximity to each other than to the lobe 69, and the lobe 69 is disposed in closer proximity to the lobe 70 than to the lobe 71. The lobes 69, 70 and 71 are materially of less height than the lobes 54 and 55.

In Figure 1 the lever 75 is shown in full lines in its forward position, in which position the lobe 71 is in engagement with the roller 66 by means of which the yoke 61 is moved forwardly to force the sleeve 34 against the collar 24. When the sleeve 34 is in this position the actuating members 28 are rocked forwardly by means of the links 31 whereby the actuating members 28 are brought into contact with the plate 22 whereby the discs 21 are frictionally gripped between the plates 22 and 25 to couple the intermediate shaft 17 with the drive shaft 3. With the lever 75 in the position shown, the lobe 55 on the cam 56 is in engagement with the roller 53 whereby the yoke 48 is swung forwardly to move the clutch face 15 of the coupling element 14 into engagement with the clutch face 16 on the intermediate shaft 17. It will be readily seen that with the lever 75 in the position shown in full lines, the driven shaft 7 is connected with the intermediate shaft 17 to rotate the driven shaft 7 in the direction of rotation of the intermediate shaft 7.

In order that the lever 75 may be readily and accurately located in a selected position, a selector element 76 is non-rotatably mounted on the shaft 68. The element 76 is substantially fan shaped and is provided in one side face with a series of spaced recesses 77, 78 and 79 which are adapted to be brought into engagement selectively with a spring pressed ball 80 projecting from an opening 81 through the inner face of the housing 1. When the ball 80 is engaged with the recess 78, the lever 75 is in proper position to maintain the shifting member 62 in neutral position as shown in Figure 4. When the ball 80 is engaged with the recesses 77 and 79 respectively, the lever 75 is in proper position to maintain the coupling element 14 in engagement with the intermediate shaft 17 and idler gear 42 respectively.

If it is desired to reverse the direction of rotation of the driven shaft 7, the lever 75 is moved to the position shown in dotted lines in Figure 1. Upon so moving the lever 75, the lobes 71 and 55 respectively are moved out of engagement with the rollers 66 and 53. At the same time the lobe 69 is brought into engagement with the roller 65 whereby the yoke 61 is swung rearwardly by means of which the actuating members 28 are drawn away from the plate 22. A continued movement of the lever 75 brings the lobe 54 into engagement with the roller 52 whereby the yoke 48 is swung rearwardly to disengage the coupling element 14 from the intermediate shaft 7 and to bring the gear 44 on the coupling element 14 into mesh with the idler gear 42. With the gear 44 in mesh with the idler gear 42, the yoke 48 is in the position shown in dotted lines in Figure 1. After the lobe 54 is moved into engagement with the roller 52, the lobe 69 is moved out of engagement with the roller 65 and the lobe 70 is moved into engagement with the roller 66, whereby the yoke 61 is again swung forwardly to force the actuating members 28 into engagement with the plate 22. From the foregoing it will be seen that the clutch is disengaged prior to the shifting of the coupling element 14 in either direction. It is to be noted that positive movement is provided for the yokes 48 and 61 both forwardly and rearwardly, and that the shifting member 62 is positively held in the neutral position shown in Figure 4 during the time that the coupling element 14 is out of engagement with both the intermediate shaft 17 and idler gear 42.

It is thought that the many advantages of a reverse gear and clutch operating mechanism in accordance with this invention will be readily apparent, and although the preferred embodiment of the invention is as illustrated and described, it is to be understood that changes in the size, shape and arrangement of parts may be resorted to, so long as such changes fall within the scope of the invention as defined in the appended claims.

What I claim is:—

1. In a mechanism for operating a clutch and a reverse gearing, a pivotally mounted shifting element for the clutch and including an upper and a lower yoke disposed at right angles to each other, a pivotally mounted shifting element for the reverse gearing and including an upper and a lower yoke disposed at right angles to each other, a rotatably mounted cam operating in and coacting with the upper yoke of and for controlling the shifting element for the clutch, a rotatably mounted cam operating in and coacting with the upper yoke of and for controlling the shifting element for the reverse gearing, means for oscillating said cams in unison, a lobe on the cam for controlling the reverse gearing shifting element to shift the latter in one direction when the cams are at their limits of movement in one direction, a lobe on the cam for controlling the reverse gearing shifting element to shift the latter in the opposite direction when the cams are at their limits of movement in the opposite direction, a pair of lobes on the cam for controlling the clutch shifting element to shift the latter in one direction when said cams are at their limits of movement in either direction, and a lobe on the cam for controlling the clutch shifting element to shift the latter in the opposite direction when said cams are intermediate their limits of movement.

2. In a mechanism for operating a clutch and a reverse gearing, a pivotally mounted shifting element for the clutch, a pivotally mounted shifting element for the reverse gearing, each of said shifting elements being formed at one end with a yoke, a rotatably mounted cam for controlling the shifting element for the clutch, a rotatably mounted cam for controlling the shifting element for the reverse gearing, means for oscillating said cams in unison, a lobe on the cam for controlling the reverse gearing shifting element for engagement with one end portion of the yoke on the latter to shift the same in one direction when the cams are at their limits of movement in one direction, a lobe on the cam for controlling the reverse gearing shifting element for engagement with the opposite end portion of the yoke on the latter to shift the same in the opposite direction when the cams are at their limits of movement in the opposite direction, a pair of lobes on the cam for controlling the clutch shifting element for respective engagement with one end portion of the yoke on the latter to shift the same in one direction when said cams are at their limits of movement in either direction, and a lobe on the cam for controlling the clutch shifting element for engagement with the opposite end portion of the yoke on the latter to shift the same in the opposite direction when said cams are intermediate their limits of movement.

3. In a mechanism for operating a clutch and a reverse gearing, a pivotally mounted shifting element for the clutch and including an upper and a lower yoke disposed at right angles to each other, a pivotally mounted shifting element for the reverse gearing and including an upper and a lower yoke disposed at right angles to each other, a rotatably mounted cam operating in and coacting with the upper yoke of and for controlling the shifting element for the clutch, a rotatably mounted cam operating in and coacting with the upper yoke of and for controlling the shifting element for the reverse gearing, means for oscillating said cams in unison, a lobe on the cam for controlling the reverse gearing shifting element to shift the latter in one direction when the cams are at their limits of movement in one direction, a lobe on the cam for controlling the reverse gearing shifting element to shift the latter in the opposite direction when the cams are at their limits of movement in the opposite direction, a pair of lobes on the cam for controlling the clutch shifting element to shift the latter in one direction when said cams are at their limits of movement in either direction, and a lobe on the cam for controlling the clutch shifting element to shift the latter in the opposite direction when said cams are intermediate their limits of movement, the lobes on the cam for controlling the reverse gearing shifting element being of materially greater height than the lobes on the cam for controlling the clutch shifting element.

4. In a mechanism for operating a clutch and a reverse gearing, a pivotally mounted shifting element for the clutch and including an upper and a lower yoke disposed at right angles to each other, a pivotally mounted shifting element for the reverse gearing and including an upper and a lower yoke disposed at right angles to each other, a rotatably mounted cam operating in and coacting with the upper yoke of and for controlling the shifting element for the clutch, a rotatably mounted cam operating in and coacting with the upper yoke of and for controlling the shifting element for the reverse gearing, means including a lever for oscillating said cams in unison, said cam for controlling the reverse gearing shifting element having means for shifting the latter in opposite directions when said cams are at their limits of movement, said cam for controlling the clutch shifting element having means for shifting the latter in one direction when said cams are at their limits of movement, said cam for controlling the clutch shifting element further having means for shifting the latter in the opposite direction when said cams are intermediate their limits of movement, and means coacting with said lever for releasably latching said cams at their limits of movement and intermediate their limits of movement.

In testimony whereof, I affix my signature hereto.

ROY M. UPTON.